United States Patent
Kuroda (10) Patent No.: US 11,444,523 B2
(45) Date of Patent: Sep. 13, 2022

(54) MOTOR

(71) Applicant: MINEBEA MITSUMI INC., Nagano (JP)

(72) Inventor: Minoru Kuroda, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 476 days.

(21) Appl. No.: 16/118,083

(22) Filed: Aug. 30, 2018

(65) Prior Publication Data

US 2018/0375413 A1    Dec. 27, 2018

Related U.S. Application Data (63) Continuation of application No. 14/812,472, filed on Jul. 29, 2015, now Pat. No. 10,069,391, which is a continuation of application No. 13/556,713, filed on Jul. 24, 2012, now Pat. No. 9,124,162, which is a continuation of application No. 13/179,375, filed on Jul. 8, 2011, now Pat. No. 8,264,112, which is a continuation of application No. 12/659,481, filed on Mar. 10, 2010, now Pat. No. 8,013,489, which is a continuation of application No. 12/320,688, filed on Feb. 2, 2009, now Pat. No. 7,714,472, which is a
(Continued)

(30) Foreign Application Priority Data

May 27, 2005  (JP) ................................. 2005-156248
Dec. 1, 2005  (JP) ................................. 2005-348016

(51) Int. Cl.
H02K 23/04    (2006.01)
H02K 1/17     (2006.01)

(52) U.S. Cl.
CPC ............... *H02K 23/04* (2013.01); *H02K 1/17* (2013.01)

(58) Field of Classification Search
CPC .................................. H02K 1/17; H02K 23/04
USPC ....................................................... 310/154.21
See application file for complete search history.

(56) References Cited

U.S. PATENT DOCUMENTS 2,939,024 A    5/1960  Mabuchi
3,296,471 A    1/1967  Cochardt
(Continued)

FOREIGN PATENT DOCUMENTS

DE    23 47 856 A1    4/1975
EP    0 103 980 A1    3/1984
(Continued)

OTHER PUBLICATIONS

Non-Final Office Action U.S. Appl. No. 13/179,375 dated Dec. 14, 2011.
(Continued)

*Primary Examiner* — Alex W Mok
(74) *Attorney, Agent, or Firm* — Pearne & Gordon LLP (57) ABSTRACT

A small DC motor includes a motor frame having a cylindrical portion, the cylindrical portion having a constant thickness and having a cross section in a shape that comprises four sides and connecting portions, each of the connecting portions connecting adjacent two of the four sides and being located inward from a corresponding corner in a quadrangle comprising the four sides; and a magnet having a circumferential surface on an inside thereof and having conformable contact with the motor frame on an outside thereof.

10 Claims, 8 Drawing Sheets

Related U.S. Application Data continuation of application No. 11/441,191, filed on May 26, 2006, now Pat. No. 7,528,515.

(56) References Cited

U.S. PATENT DOCUMENTS

| | | | |
|---|---|---|---|
| 4,110,645 A * | 8/1978 | Hendershot, Jr. | H02K 23/04 310/154.07 |
| 4,243,903 A | 1/1981 | Mishima | |
| 4,363,987 A | 12/1982 | Vorotyntseva et al. | |
| 4,376,903 A | 3/1983 | Mishima | |
| 4,412,145 A | 10/1983 | Voss et al. | |
| 4,453,097 A | 6/1984 | Lordo | |
| 5,412,267 A | 5/1995 | Okada et al. | |
| 5,497,039 A | 3/1996 | Blaettner et al. | |
| 5,528,096 A * | 6/1996 | Orii | G10F 1/06 310/237 |
| 6,264,112 B1 | 7/2001 | Landschoot et al. | |
| 6,433,448 B1 | 8/2002 | Hatton | |
| 6,459,185 B1 | 10/2002 | Ehrhart et al. | |
| 6,708,388 B1 | 3/2004 | Yamashita et al. | |
| 6,812,615 B1 | 11/2004 | Ettridge | |
| 6,995,488 B1 | 2/2006 | Yamashita et al. | |
| 7,498,706 B2 | 3/2009 | Kuroda | |
| 7,528,515 B2 * | 5/2009 | Kuroda | H02K 23/04 310/154.21 |
| 7,714,472 B2 * | 5/2010 | Kuroda | H02K 1/17 310/154.22 |
| 7,732,962 B2 | 6/2010 | Kuroda | |
| 7,800,270 B2 | 9/2010 | Kuroda | |
| 8,013,489 B2 * | 9/2011 | Kuroda | H02K 1/17 310/154.21 |
| 8,264,112 B2 * | 9/2012 | Kuroda | H02K 23/04 310/154.22 |
| 9,124,162 B2 * | 9/2015 | Kuroda | H02K 1/17 |
| 10,069,391 B2 * | 9/2018 | Kuroda | H02K 1/17 |
| 2002/0121831 A1 * | 9/2002 | Egawa | H02K 1/24 310/216.001 |
| 2006/0279159 A1 | 12/2006 | Kuroda | |
| 2007/0007838 A1 | 1/2007 | Kuroda | |
| 2009/0134729 A1 | 5/2009 | Kuroda | |
| 2009/0152971 A1 | 6/2009 | Kuroda | |
| 2010/0072848 A1 | 3/2010 | Kuroda | |
| 2010/0181857 A1 | 7/2010 | Kuroda | |
| 2011/0266906 A1 | 11/2011 | Kuroda | |
| 2011/0266907 A1 | 11/2011 | Kuroda | |

FOREIGN PATENT DOCUMENTS

| | | | |
|---|---|---|---|
| JP | 63-228951 A | 9/1988 | |
| JP | 01-255462 A | 10/1989 | |
| JP | 07-059322 A | 3/1995 | |
| JP | 08-228451 | 9/1996 | |
| JP | 09-224337 A | 8/1997 | |
| JP | 09-331642 | 12/1997 | |
| JP | 10-201206 A | 7/1998 | |
| JP | 10-248228 | 9/1998 | |
| JP | 11-098799 A | 4/1999 | |
| JP | 11-103552 | 4/1999 | |
| JP | 11-136883 | 5/1999 | |
| JP | 2001-028856 A | 1/2001 | |
| JP | 2001-045702 | 2/2001 | |
| JP | 2001-045702 A | 2/2001 | |
| JP | 2001-086687 A | 3/2001 | |
| JP | 2002-027687 A | 1/2002 | |
| JP | 2002-101597 A | 4/2002 | |
| JP | 2002-300740 A | 10/2002 | |
| JP | 2003-143783 A | 5/2003 | |
| JP | 2005-020914 A | 1/2005 | |
| WO | WO-00/45500 A1 | 8/2000 | |
| WO | WO-02/075900 A1 | 9/2002 | |

OTHER PUBLICATIONS

Notice of Allowance in U.S. Appl. No. 12/659,481 dated May 4, 2011.
Notice of Allowance in U.S. Appl. No. 13/179,366 dated Feb. 1, 2012.
Office Action in U.S. Appl. No. 12/659,481 dated Jun. 25, 2010.
U.S. Notice of Allowance U.S. Appl. No. 13/179,375 dated Apr. 27, 2012.
U.S. Notice of Allowance on 054881-0133 dated Apr. 30, 2015.
U.S. Notice of Allowance on U.S. Appl. No. 14/812,472 dated May 4, 2018.
U.S. Office Action on 054881-0133 dated Nov. 19, 2014.
U.S. Office Action on U.S. Appl. No. 14/812,472 dated Nov. 16, 2017.

* cited by examiner

PRIOR ART

1

MOTOR

This application is a continuation of application Ser. No. 13/556,713, filed Jul. 24, 2012, which is a continuation of application Ser. No. 13/179,375, filed Jul. 8, 2011, which is a continuation of 12/659,481, filed Mar. 10, 2010, which is a continuation of application Ser. No. 12/320,688, filed Feb. 2, 2009, which is a continuation of application Ser. No. 11/441,191, filed May 26, 2006.

BACKGROUND OF THE INVENTION

Field of the Invention

The present invention relates to a small DC motor which is reduced in volume and is made to be easily mounted.

Background Art

In DC motors which are used in laser printers, inkjet printers and other electrical equipment, there exists a demand that motors be reduced in size while the properties thereof are maintained.

Due to this, the external shape of a motor is made smaller in such a state that a magnetic constituent portion (outside diameter and lamination thickness of an armature core) of a rotating element which determines the properties of the motor is maintained by changing the shape of a magnetic constituent portion (magnet, motor frame) of a stationary element.

For a DC motor to rotate, since a ratio of the number of magnetized magnetic poles (N: a positive arbitrary number) to the number of slots (M: a positive arbitrary number) basically becomes 2N:3M, the number of magnetized magnetic poles of a magnet is 2 poles, 4 poles, 6 poles, 8 poles, . . . . Generally, DC motors are formed into oval and cylindrical shapes, and in the event of a motor of an oval shape, a magnet is magnetized to 2 poles, whereas in the event of a motor of a cylindrical shape, a magnet is magnetized to 2 to 2N poles. For the cylindrical motor to be reduced in size, the grade (maximum energy product: $(BH)_{max}$) is increased, the thickness of the magnet is reduced and the outside diameter of a core is reduced while the properties of the motor are maintained. However, in the event that the thickness of the magnet is changed, it is extremely difficult, in most cases, to maintain the motor properties only by upgrading the grade of the magnet.

In addition, in the motors which are required to be reduced in size, motor frames are formed as small as possible due to the necessity of narrowing the accommodation space. Due to this, in many cases, motor frames are formed into cylindrical and oval shapes so as to match the shapes of rotors, and also in motor frames of a type in which field magnets are mounted thereon, the cylindrical and oval shapes are similarly used.

A related art is disclosed in JP-A-07-059322 (the term "JP-A" as used herein means an "unexamined published Japanese patent application") below which attempts to realize the reduction in the external size of a motor and easy mounting thereof while maintaining the properties of a motor. By forming a motor frame into a quadrangular shape having the same number of corner portions as the number of magnetized magnetic poles of a magnet, the reduction in size of a motor is enabled without changing the external shape of an armature core and furthermore without reducing the thickness of central portions of the poles of the magnet so as to maintain the properties of the motor.

Figure 8:
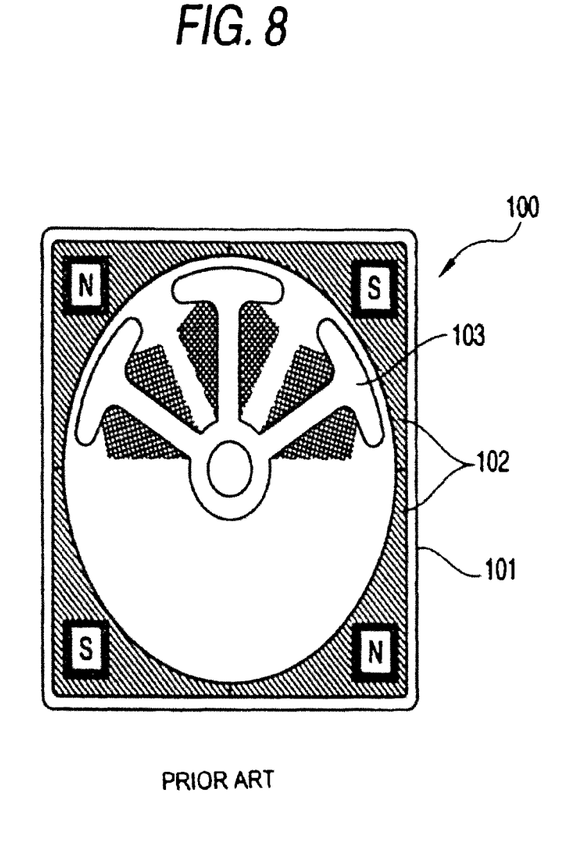
FIG. 8 is a transverse cross section of a small direct current (DC) motor described in JP-A-7-059322.

FIG. 8 is a cross sectional view of a small DC motor described in JP-A-7-059322.

A small DC motor 100 in FIG. 8 comprises a quadrangular cylindrical motor frame 101 having a substantially square cross section, a magnet 102 accommodated inside the motor frame 101 and having a circular cylindrical space therein which has four magnetic poles which are magnetized alternately to N pole and S pole in such a manner that centers of the magnetic poles come to lie in corner portions of the quadrangular cylindrical motor frame, respectively, a rotor 103 which is accommodated in the circular cylindrical space in the magnet 102 via a radial gap, and a feeding terminal (not shown) which is drawn out of one side of the quadrangular cylindrical motor frame 101 so that the motor is placed horizontally on an printed circuit board (not shown) for use.

In the small DC motor 100 disclosed in JP-A-07-059322 which has the four-magnetic-pole field magnet 102 which is magnetized to have the four magnetic poles which are magnetized alternately to N pole and S pole, the motor frame which holds the field magnet 102 is formed so as to have the substantially square cross section, and the field magnet 102 is magnetized so that the centers of the magnetic poles come to lie in the corners of the square. A magnet used as the field magnet 102 is made up of a plastic magnet and is molded together with the quadrangular cylindrical motor frame 101.

According to this configuration, since the motor takes the angular or quadrangular prism shape, the motor can be fixed to a printed circuit board or the like by being bonded thereto by means of a adhesive double coated tape. Since the thickness of the magnet 102 at the portions thereof which lie in the corners of the quadrangular shape is increased, an actual permeance coefficient is increased.

In the small DC motor described in JP-A-07-059322, however, since the magnet is filled even to the four corners of the motor frame, the thickness of the magnet is such as to be more than what is needed by an actual driving property. Namely, when viewed in a radial direction from the center of rotation, the thickness of the magnet becomes thickest at the portions of the magnet which correspond to the four corner portions of the motor frame and exceeds a magnet thickness where a sinusoidal property needed by a magnetic property (a magnetic flux density property) is formed. Due to this, the magnet portions which correspond to the four corner portions of the motor frame can be cut by such an extent that there is caused no problem with the magnetic property.

In addition, since an advantage is said to be provided that when fixing a motor frame, the motor frame can easily be fixed in the event that the motor frame has plane sides, the advantage is understood to be provided overall in the event that part of each of the original plane sides of the motor frame remains intact. The aforesaid related art example has problems with these points.

SUMMARY OF THE INVENTION

In view of the points raised as the problems, an object of the invention is to provide a small DC motor which is easy to be mounted and is reduced in size without lowering the driving property.

With a view to accomplishing the object, the following solutions will be provided.

(1) There is provided a small DC motor including a motor frame comprising a cylindrical portion, the cylindrical portion having a constant thickness and having a cross section in a shape that comprises four sides and connecting portions, each of the connecting portions connecting adjacent two of the four sides and being located inward from a corresponding corner in a quadrangle comprising the four sides; and a magnet having a circumferential surface on an inside thereof and having conformable contact with the motor frame on an outside thereof.

(2) There is provided a small DC motor as set forth in (1) above, wherein each of the connecting portions has arc-shape.

(3) There is provided a small DC motor as set forth in (1) above, wherein each of the connecting portions has arc-shape of ratio relative to a radius of the circumferential surface of the magnet.

(4) There is provided a small DC motor as set forth in (1) above, wherein each of the connecting portions has a straight line-shape.

(5) There is provided a small DC motor as set forth in (1) above, wherein the cross section of the motor frame has a shape with 2(n+1) sides and angles, and n represents a positive integer.

(6) There is provided a small DC motor as set forth in (1) above, wherein the magnet comprises portions magnetized to different magnetic poles alternately in one direction along the circumferential surface.

(7) There is provided a small DC motor as set forth in (6) above, wherein the portions magnetized are separated from one another.

(8) There is provided a small DC motor as set forth in (6) above, wherein the portions magnetized to different magnetic poles have contact with one of the connecting portions of the motor frame.

(9) There is provided a small DC motor as set forth in (1) above, wherein a ratio of a maximum width (L2) to a minimum width (L1) in a radial direction of the magnet is set in the range of $2.0 \leq L2/L1 \leq 3.0$.

(10) There is provided a small DC motor as set forth in (3) above, wherein the ratio of the arc-shape of the connecting portions to the radius of the circumferential surface of the magnet ranges from 65% to 85%.

(11) There is provided a small DC motor as set forth in (1) above, which comprises an armature assembly rotatably disposed within the motor frame, wherein the armature assembly comprises: an armature windings-molded element of a cylindrical coil wounded by a magnet wire; and an inner yoke comprising a cylindrical portion fixed in such a manner to face the armature windings-molded element.

(12) There is provided a small DC motor as set forth in (1) above, which comprises an armature assembly rotatably disposed within the motor frame, wherein the armature assembly comprises: an armature windings-molded element of a cylindrical coil wounded by a magnet wire; and a cylindrical movable back yoke having contact with an inner side of the armature windings-molded element.

Since a small DC motor of the invention is made such as to include a motor frame having a motor frame comprising a cylindrical portion, the cylindrical portion having a constant thickness and having a cross section in a shape that comprises four sides and connecting portions, each of the connecting portions connecting adjacent two of the four sides and being located inward from a corresponding corner in a quadrangle comprising the four sides; and a magnet having a circumferential surface on an inside thereof and having conformable contact with the motor frame on an outside thereof, the shape of the magnet can be made smaller in size while maintaining the necessary magnetic property, and in association with this, the shape of the motor frame can be made easier to mount and smaller in size.

Even in the event that the cross section of the motor frame has a shape with 2(n+1) sides and angles, the intended advantage is provided. In this regard, n is a positive integer.

Since, as viewed in a radial direction thereof, a ratio of a maximum width(L2) to a minimum width(L1) of the magnet is set in the range of $2.0 \leq L2/L1 \leq 3.0$, the shape of the magnet can be made smaller in size while maintaining the necessary magnetic property.

By incorporating the field magnet configuration of the invention in a coreless motor or slotless cored motor, those motors can be made smaller in size while increasing torque to be generated.

BRIEF DESCRIPTION OF THE DRAWINGS

The invention disclosed herein will be understood better with reference to the following drawings of which:

FIGS. 1A, 1E and 1I are one side views, FIGS. 1B, 1F and 1J are transverse sectional views, FIGS. 1C, 1G and 1K are longitudinal views.

FIGS. 3A1 to 3E1 are end views and FIGS. 3A2 to 3E2 are transverse sectional views, which explain various embodiments of the invention, and FIG. 3F1 is an end view and FIG. 3F2 is a transverse sectional view, which explain embodiment of the related art;

DETAILED DESCRIPTION OF THE INVENTION

Exemplary embodiments of the invention will be described in detail below based on the accompanying drawings. However, it is to be understood that the invention is not intended to be limited to the specific embodiments.

Embodiment 1

FIGS. 1A to 1L illustrate explanatory drawings which describe features of a small DC motor of the invention while comparing it to related counterparts.

Figure 1A:
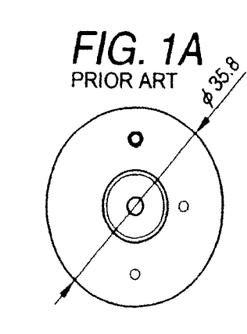
Figure 1B:
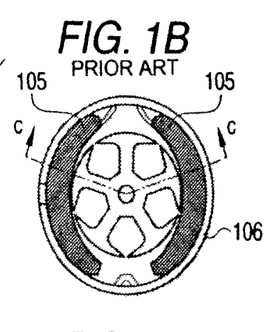
Figure 1C:
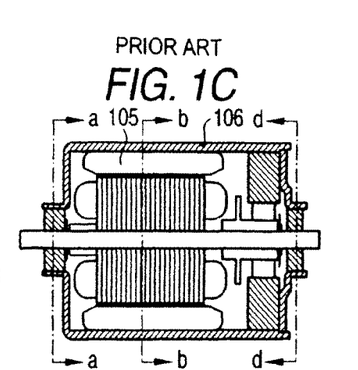
Figure 1D:
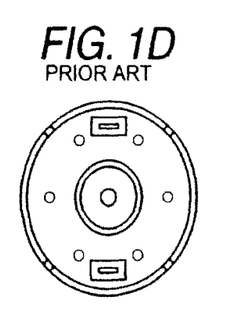
FIGS. 1D, 1H and 1L are another end views, which explain features of a small DC motor of the invention through comparison with a related example.

FIGS. 1A to 1D are drawings which show the configuration of a related general DC motor which utilizes ferrite magnets, in which FIG. 1A is a one side view as seen in a direction indicated by arrows a in FIG. 1C, FIG. 1B is a transverse sectional view taken along a line b-b in FIG. 1C, FIG. 1C is a sectional view taken along a line c-c in FIG. 1B, and FIG. 1D is a another side view as seen in a direction indicated by arrows d in FIG. 1C.

In FIGS. 1A to 1D, a construction is adopted in which two magnets 105 being magnetized to N pole and S pole in a rotating direction and each having an arc-like cross section are axisymmetrically provided with gaps provided therebetween in such a manner as to follow a side wall of a circular cylindrical motor frame 106.

When adopting the construction, in an example, with a rotor having a diameter of 23 mm, the diameter of the motor frame becomes 35.8 mm.

Figure 1E:
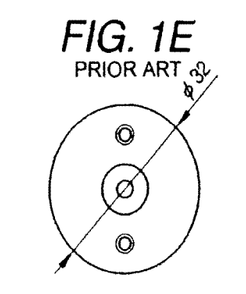
Figure 1F:
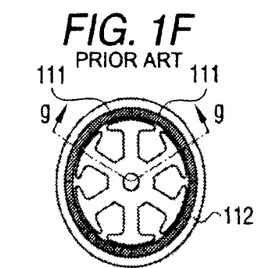
Figure 1G:
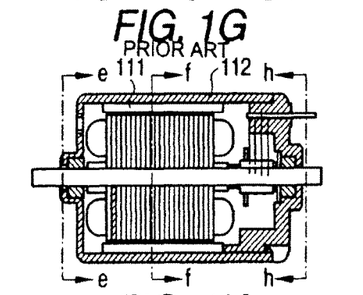
Figure 1H:
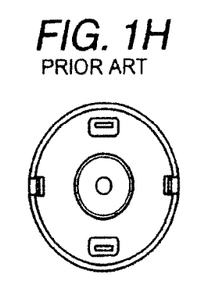

FIGS. 1E to 1H are drawings which show the configuration of a related DC motor which utilizes neodymium magnets, in which FIG. 1E is a one side view as seen in a direction indicated by arrows e in FIG. 1G, FIG. 1F is a transverse sectional view taken along the line f-f in FIG. 1G, FIG. 1G is a sectional view taken along a line g-g in FIG. 1F, and FIG. 1H is a another side view as seen in a direction indicated by arrows h in FIG. 1G.

In FIGS. 1E to 1H, a construction is adopted in which four magnets 111 being magnetized to N pole or S pole in a rotating direction and each having an arc-like cross section are axisymmetrically provided in such a manner as to follow a side wall of a circular cylindrical motor frame 112. By changing grades of magnets from the ferrite magnets ((BH)max(BaO•6Fe$_2$O$_3$)••13(J/m$^3$×10$^3$), (BH)max(SrO•6Fe$_2$O$_3$)••17(J/m$^3$×10$^3$)) shown in FIG. 1A whose maximum energy product ((BH)max) is relatively small to the neodymium magnets ((BH)max(Nd$_2$Fe$_{14}$B)••180(J/m$^3$×10$^3$)) in this example whose maximum energy product ((BH)max)) is large, with a rotor of the same diameter, the diameter of the motor frame can be reduced. When adopting the construction, in an example, with a rotor having a diameter of 23 mm, the diameter of the motor frame becomes 32 mm.

Figure 1I:
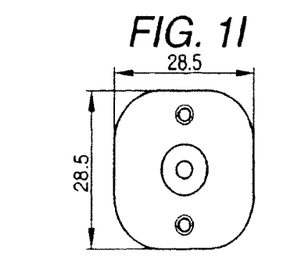
Figure 1J:
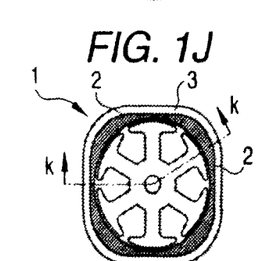
Figure 1K:
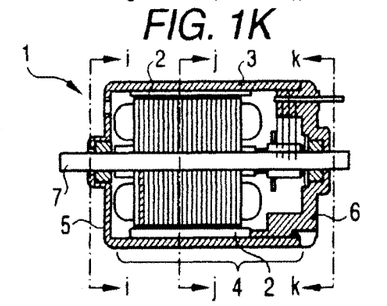
Figure 1L:
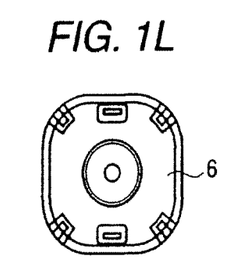

FIGS. 1I to 1L are drawings which show the configuration of a small DC motor of the invention which utilizes neodymium magnets, in which FIG. 1I is a one side view as seen in a direction indicated by arrows i in FIG. 1K, FIG. 1J is a transverse sectional view taken along a line j-j in FIG. 1K, FIG. 1K is a sectional view taken along a line k-k in FIG. 1J, and FIG. 1L is an another side view as seen in a direction indicated by arrows l in FIG. 1K.

In a small DC motor 1 shown in FIGS. 1I to 1L, a construction is adopted in which four magnets 2 being magnetized to N pole or S pole in a rotating direction and each having an arc-like cross section are axisymmetrically provided in such a manner as to follow a side wall of a cylindrical motor frame 3 to thereby be formed into an annular shape.

The motor frame 3 has a cylindrical portion 4, the cylindrical portion 4 having a constant thickness and having a cross section in a shape that comprises four sides and connecting portions, each of the connecting portions connecting adjacent two of the four sides and being located inward from a corresponding corner in a quadrangle comprising the four sides and an end plate portion 5 having therein an opening through which a shaft 7 is passed. In particular, in the event of this example, the connecting positions have a shape which is rounded by an arc which constitutes part of a circle concentric with the center of the shaft 7.

An end cap 6, which is made of resin, is fitted in an open end of the cylindrical portion 4 of the motor frame 3. The end cap 6 has an opening through which the shaft 7 is passed, and brushes, adapted to be brought into contact with a commutator that is to be provided on the shaft 7, and a terminal portion thereof are fixedly press fitted in the end cap.

The magnets 2 has a circumferential surface on an inside thereof and has conformable contact with the motor frame on an outside thereof.

When this construction is adopted, in an example, with a rotor having a diameter of 23 mm, a shortest outside diameter of the motor frame becomes 28.5 mm.

In addition, the material of the magnet 2 to be adopted does not differ from that of the related DC motor shown in FIG. 1(e) which utilizes the neodymium magnets.

When considering what has been described heretofore, according to the small DC motor 1 of the invention, by adopting the configuration in which the small DC motor 1 includes the motor frame 3 comprising the cylindrical portion 4, the cylindrical portion 4 having a constant thickness and having a cross section in a shape that comprises four sides and connecting portions, each of the connecting portions connecting adjacent two of the four sides and being located inward from a corresponding corner in a quadrangle comprising the four sides; and the magnet having a circumferential surface on an inside thereof and having conformable contact with the motor frame on an outside thereof, the small DC motor 1 of the invention is to have features in which the cross-sectional area of the motor frame 3 can be minimized while maintaining a magnetic property (a sinusoidal property according to rotation) which is necessary to maintain the driving property, and in which since planes including sides made up of straight lines are formed on side walls of the motor frame 3, when viewed in cross section, the motor frame 3 can easily be mounted.

(Shapes of Magnets)

Among constituent parts which make up a DC motor, magnets are most expensive parts and hence need to be minimized in mass while maintaining the motor properties.

The magnets of the invention will be described while compared to the related magnets disclosed in JP-A-07-059322.

Figures 2A, 2B:
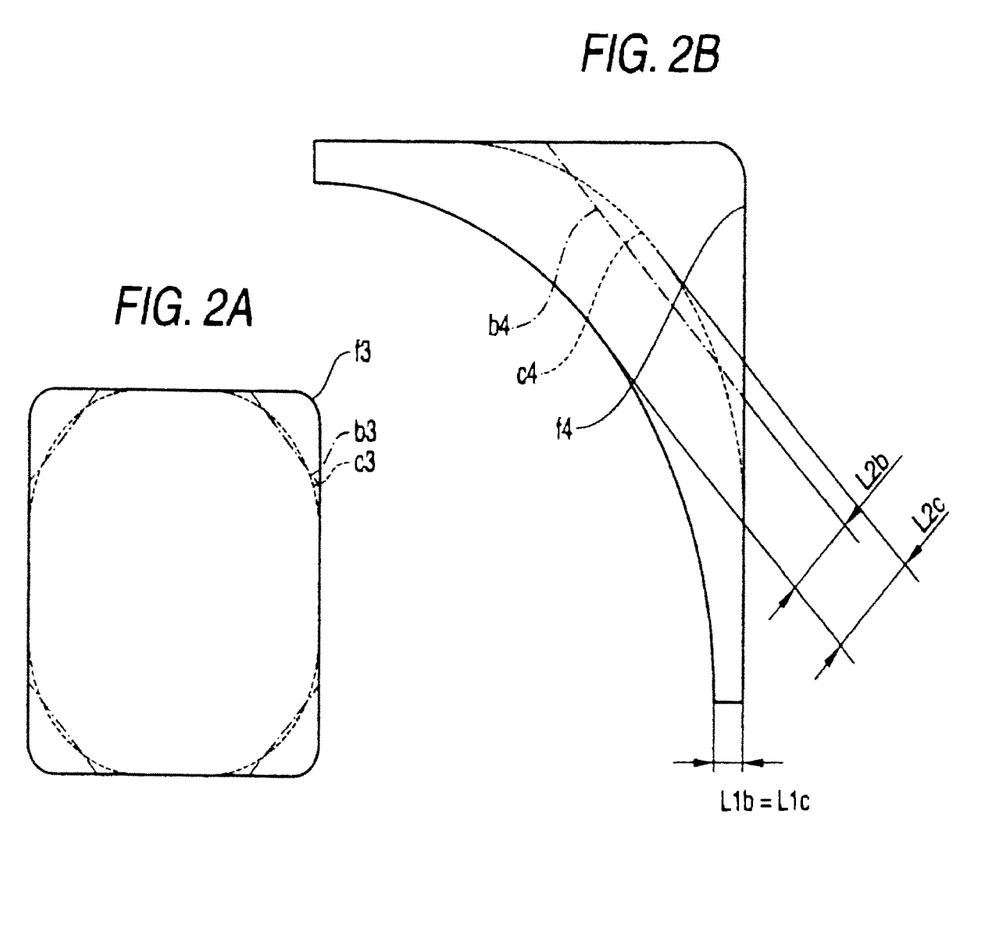
FIG. 2A is a sectional view which explains features of a motor frame of the invention through a comparison with the related example and FIG. 2B is an enlarged vertical longitudinal sectional view which explains features of a magnet of the invention through a comparison with the related example.

FIGS. 2A and 2B illustrate explanatory drawings which explain the features of the motor frame and the magnets of the invention through comparison with those of the related example.

To be specific, the drawings illustrated therein are comparison drawings among the related magnets described in JP-A-07-059322 (refer to FIGS. 3F1 and 3F2), the magnets of the invention illustrated in FIG. 1J (refer to FIGS. 3C1 and 3C2), and magnets for a representative motor frame having an irregular octagonal shape, which will be described later on (refer to FIGS. 3B1 and 3B2).

FIG. 2A illustrates the respective transverse cross sections of the motor frames, and FIG. 2B illustrates the enlarged vertical section of one magnetic pole of the magnets.

Firstly, the shapes of the magnets will be described.

In FIG. 2B, when the cross sections of the respective magnetic poles of the magnets are aligned with each other on their inside surfaces, the cross section of the related magnet described in JP-A-07-059322 takes a shape f4 indicated by a solid line, the cross section of the magnet of the invention shown in FIG. 1J takes a shape c4 indicated by a dotted line, and the cross section of the magnet for the irregular octagonal side frame takes a shape b4 indicated by an alternate long and short dash line.

The shapes b4 and c4 according to the invention are such as to result when the corners of the related shape f4 deform in direct of the inside surface of the magnet.

When the shapes resulting when the corners of the related shape f4 deform in direct of the inside surface of the magnet are expressed by radial widths from the center of the shaft, in the event of the shape b4, a ratio of a maximum width L2*b* to a width L1*b* (=L1*c*) at both ends in the rotating direction is set in the range of 2.0≤L2*b*/L1*b*≤3.0, and in the event of the shape c4, a ratio of a maximum width L2*c* to a minimum width (L1*c*) at both ends in the rotating direction is set in the range of 2.0≤L2*c*/L1*c*≤3.0.

(Ratio)

Next, the reason that the minimum width:maximum width ratio is set in the range of 1:2 to 1:3 will be described.

Measured data shown in Table 1 and Table 2 below were acquired by using the small DC motor of the invention shown in FIGS. 1I to 1L. A motor was used which was made up of a rotor having a diameter of 23 mm and a motor frame having a shortest diameter of 28.5 mm.

Figure 4:
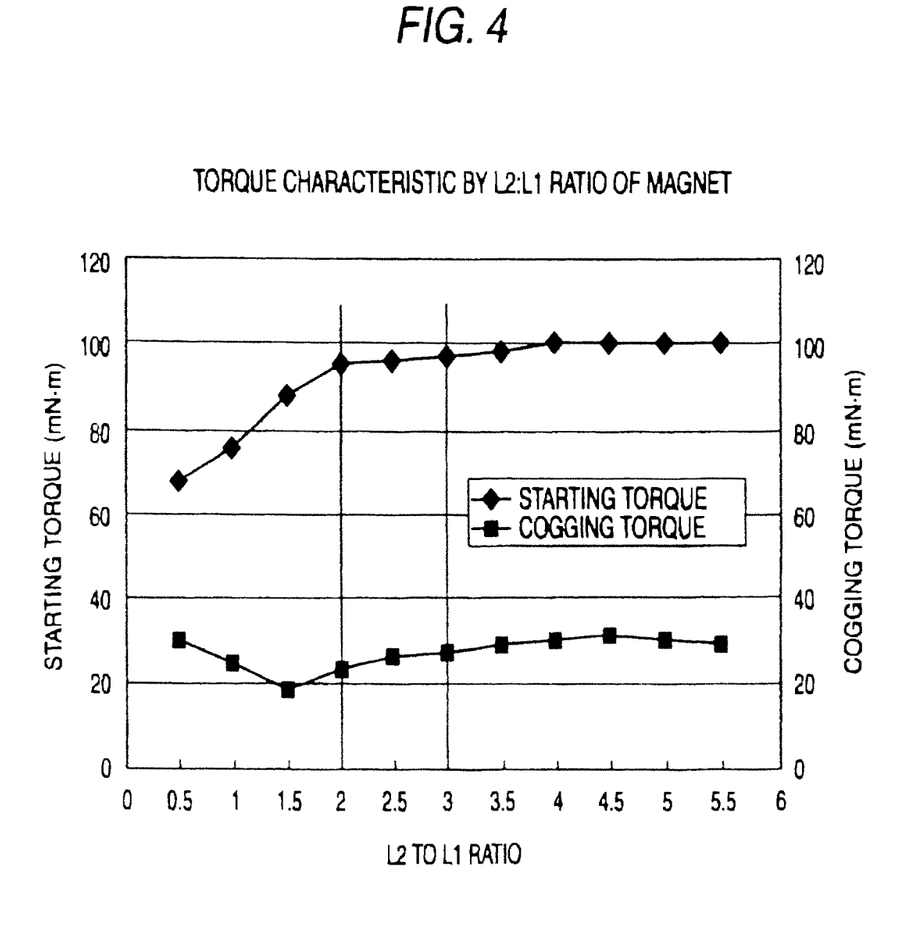
FIG. 4 is a torque characteristic graph by ratios of L2:L1 of the magnets of the invention.

FIG. 4 is a torque characteristic graph by magnet's L2:L1 ratios. Data shown in FIG. 4 are data measured by using magnet shown in FIG. 1J and are summarized in Table 1 below.

TABLE 1

Torque Characteristics by Magnet's L2:L1 Ratios

| L2/L1 | Starting Torque (mN · m) | Cogging Torque (mN · m) |
|---|---|---|
| 0.0 | | |
| 0.5 | 68 | 30 |
| 1.0 | 76 | 24 |
| 1.5 | 88 | 18 |
| 2.0 | 95 | 23 |
| 2.5 | 96 | 26 |
| 3.0 | 97 | 27 |
| 3.5 | 98 | 29 |
| 4.0 | 100 | 30 |
| 4.5 | 100 | 31 |
| 5.0 | 100 | 30 |
| 5.5 | 100 | 29 |

In the torque characteristics shown above, an L2 to L1 ratio range of 2.0≤L2/L1≤3.0 corresponds to a region where the starting torque is relatively large and the cogging torque is relatively small.

Next, the shape to which the corner of the magnet illustrated in FIG. 1J (refer to FIGS. 3C1 and 3C2) is rounded will be described.

Figure 5:
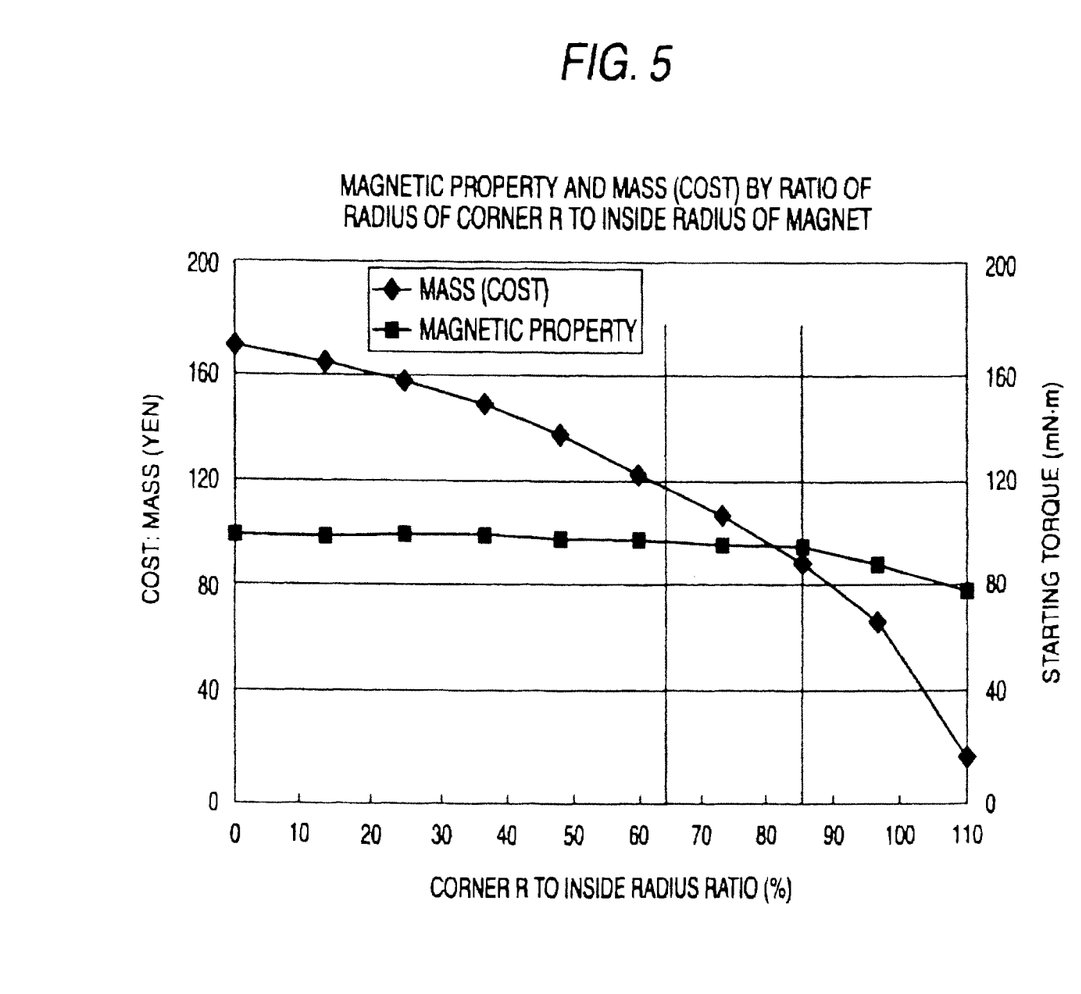
FIG. 5 is a characteristic graph of magnetic property and mass (cost) by ratios of radius of corner R to inside radius of the magnets of the invention.

FIG. 5 is a characteristic graph which shows magnetic property and mass (cost) by ratios of radius of corner R to inside radius of the magnet of the invention. Data shown in FIG. 5 are data measured by using the magnet illustrated in FIG. 1J and are summarized in Table 2 below.

TABLE 2

Magnetic Property and Mass (Cost) by Ratios of radius of Corner R to Inside Radius of the Magnet

| Ratios (%) of Corner R to Inside Radius | Starting Torque (mN · m) | Cost/Mass (yen) |
|---|---|---|
| 0 | | |
| 13.5 | 100 | 164 |
| 25.5 | 100 | 158 |
| 37.5 | 100 | 149 |
| 49.0 | 98 | 138 |
| 61.0 | 97 | 123 |
| 74.0 | 96 | 108 |
| 85.0 | 95 | 89 |
| 97.0 | 88 | 66 |
| 110.0 | 76 | 16 |

A ratio of radius of corner R to inside diameter of the magnet (namely, the radius of curvature of the corner relative to the inside diameter (radius) of the magnet) is set in a range of 65% to 85% as a range which satisfies conditions of realizing the facts that the magnetic property by ratios of radius of the corner R (the length of a radius of an arc which forms an outer curved surface of the magnet) to inside radius (the length of a radius of an arc which forms an inner curved surface) of the magnet resides in a relatively high range, while the mass property by ratios of radius of the corner R to inside radius of the magnet, that is, a property in which mass is expressed by cost resides in a relatively inexpensive range.

As a result, in the event of the shape in which the corner of the magnet is rounded (R), one or both of the following two conditions are set:

(1) A condition that the ratio of the width L2 to the width L1 of the magnet is set in the range of 2.0≤L2/L1≤3.0; and (2) A condition that the ratio of radius of the corner R to the inside radius of the magnet is set in the range of 65% to 85%.

On the other hand, in the event of the magnet (refer to FIGS. 3B1 and 3B2) for the irregular octagonal motor frame, the corner is formed into a shape which results after being cut straight by a straight line as shown by the shape b4 in FIG. 2B. While the inclination of the straight line can be basically set arbitrarily, the inclination thereof is set to the inclination of a tangent which is tangent to an arc drawn with a radius extended from the center of the arc which forms the inner curved surface of the magnet, an inclination at a predetermined angle from an outer straight portion of the magnet when viewed in cross section or an inclination at an angle which matches the polygonal shape of the motor frame.

In the event of the shape resulting when the corner is cut straight by the straight line, the condition is necessary that the ratio of the width L2 to the width L1 of the magnet is set in the range of 2.0≤L2/L1≤3.0.

In addition, the small DC motor of the invention may be such that the magnets are magnetized alternately to different magnetic poles in one direction along the circumferential surface, or the magnetized portions of the magnets may be separated from each other. Further, the portions of the magnets which are magnetized to different magnetic poles may have portions which have conformable contact with the connecting portions of the motor frame.

(Shapes of Motor Frames)

FIG. 2A is a drawing which shows external shapes of the cross sections of the motor frames.

In the figure, the related motor frame described in JP-A-07-059322 constitutes a shape f3 indicated by a solid line, the motor frame of the invention shown in FIG. 1J constitutes a shape c3 indicated by a dotted line, and the irregular octagonal motor frame of the invention constitutes a shape b3 indicated by an alternate long and short dash line. When compared to the shape f3 of the related example, it is seen that the shapes c3 and b3 of the invention constitute shapes in which corners thereof are largely cut, reducing a space that is occupied by the motor frames, respectively. In addition, since straight sides are formed on both sides of the arc, a stable mounting, free from vibration, is possible.

In addition, in the small DC motor of the invention, each of the connecting portions may have arc-shape, arc-shape of ratio relative to a radius of the circumferential surface of the magnet, or the straight line-shape.

Further, the cross section of the motor frame 3 may have a shape with 2(n+1) sides and angles, and n represents a positive integer. According to this configuration, the basic shape (the shape resulting before the corner portions are collapsed) of the cylindrical portion 4 of the motor frame 3 can have, for example, a quadrangular shape, a hexagonal shape, an octagonal shape, . . . .

Embodiment 2

The magnets and motor frames of the invention will be described through comparison with those of the related example.

FIGS. 3A1 to 3E1 and FIGS. 3A2 to 3E2 illustrate explanatory drawings which depict various embodiments of the invention. Note that in FIGS. 3A1 to 3E1 and FIGS. 3A2 and 3E2, drawings which have the drawing number suffixed by "1" are drawings which illustrate end plates of the motor frames. In other words, they are drawings which illustrate respective external shapes of the motor frames. Drawings which have the drawing number suffixed by "2" are drawings which illustrate respective cross sections of the motor frames.

Figure 3A:
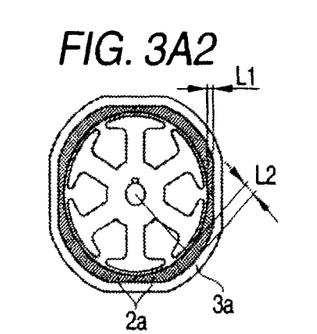
Figure 3A:
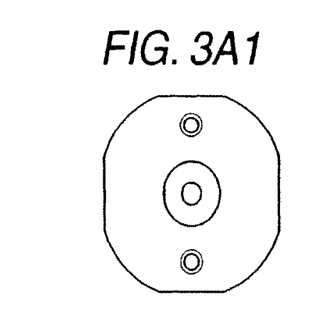
Figure 3B:
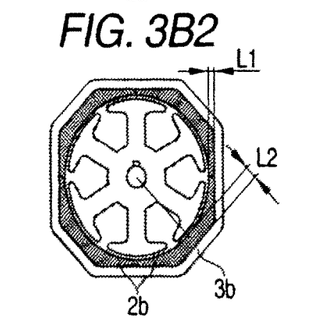
Figure 3B:
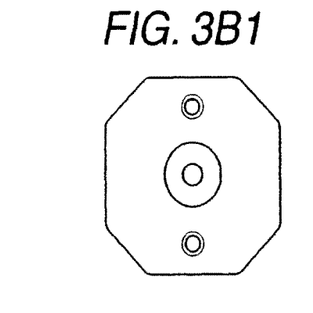
Figure 3C:
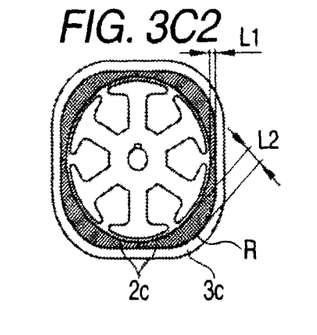
Figure 3C:
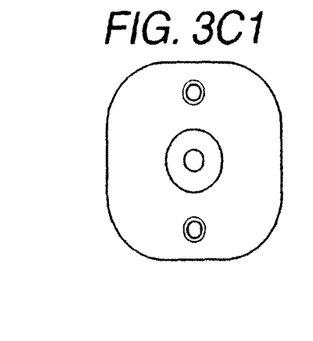
Figure 3D:
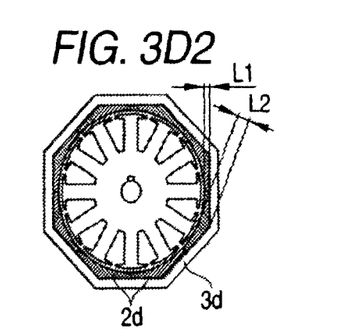
Figure 3D:
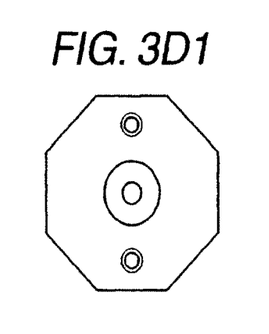
Figure 3E:
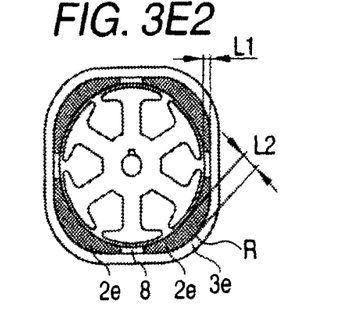
Figure 3E:
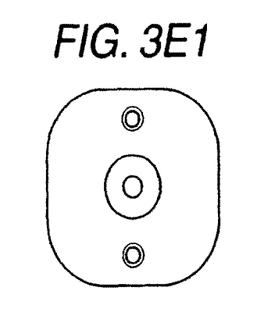
Figure 3F:
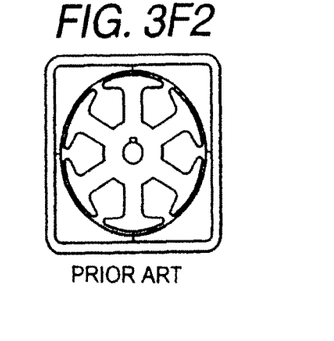
Figure 3F:
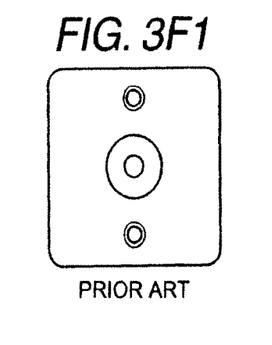

In FIGS. 3A1 and 3A2, when viewed in cross section, a motor frame 3a takes basically a round shape, and a magnet 2a is formed into a shape which secures a permeance of the magnet which is necessary to maintain the motor properties, suppresses the width of the magnet where the magnetic poles are changed over to a minimum width, enables a ratio of L1:L2, that is, a ratio of a radial thickness L1 of a portion (a thinnest portion) where the magnetic poles are changed over to a radial thickness L2 of a central portion (a thickest portion) of the magnetic pole to be in the range of 1:2 to 1:3, and leaves straight sides.

In FIGS. 3B1 and 3B2, when viewed in cross section, a motor frame 3b is formed into the irregular octagonal shape, and a magnet 2b is formed into the shape in which the thickness ratio of L1:L2 falls within the range of 1:2 to 1:3, and the straight sides are left. The other requirements are made identical to those of FIGS. 3A1 and 3A2.

In FIGS. 3C1 and 3C2, when viewed in cross section, a motor frame 3c is configured by a combination of straight lines and arcs, and a ratio of L1:L2, that is, a ratio of a radial thickness L1 of a portion (a thinnest portion) where the magnetic poles are changed over to a radial thickness L2 of a central portion (a thickest portion) of the magnetic pole is set in the range of 1:2 to 1:3, and moreover, a radius of the corner R of a magnet 2c that is constituted by an outer arc thereof is set to be in the range of 65% to 85% of an inner radius (inside radius) of the magnet 2c.

These are the conditions for the case where the thickness in the radial direction of the motor frame 3c is thin to such an extent that no practical problem is caused. However, in the event that the thickness of the motor frame 3c causes a practical problem, a condition needs to be established with respect to the inner side of the motor frame 3c which have conformable contact with the magnet 2c. Alternatively, a condition may be set with respect to the outer side of the motor frame 3c in consideration of the thickness thereof.

In FIGS. 3D1 and 3D2, when viewed in cross section, a shape of the motor having 8 poles and 12 slots is shown, and is configured in a similar way to those of the other examples. A motor frame 3d has a shape shown therein in the same way as shown in FIGS. 3B1 and 3B2. A magnet 2d is configured such that the 8 poles are disposed in corner portions of the motor frame 3d, respectively and a ratio of L1:L2, that is, a ratio of a radial thickness L1 of a portion (a thinnest portion) where the magnetic poles are changed over to a radial thickness L2 of a central portion of the magnetic pole is set in the range of 1:2 to 1:3.

In FIGS. 3E1 and 3E2, when viewed in cross section, a motor frame 3e is identical to the one shown in FIGS. 3C1 and 3C2, and for each magnetic pole of a magnet 2e to be fixed independently, a configuration is adopted in which a gap 8 is provided between adjacent magnets. A ratio of L1:L2, that is, a ratio of a radial minimum thickness L1 of the magnet 2e to a radial maximum thickness L2 at a central portion of the magnetic pole is set in the range of 1:2 to 1:3, and moreover, a radius of the corner R of the magnet 2e that is constituted by an outer arc thereof is set in the range of 65% to 85% of an inner radius (inside radius) of the magnet 2e. By adopting this configuration, the same function and advantage as those of the small DC motor of the invention in which no gap is provided between the adjacent magnets can be provided.

A space in the gap is preferably provided in a range where the driving property of the motor is not lowered.

Embodiment 3

Figure 6A:
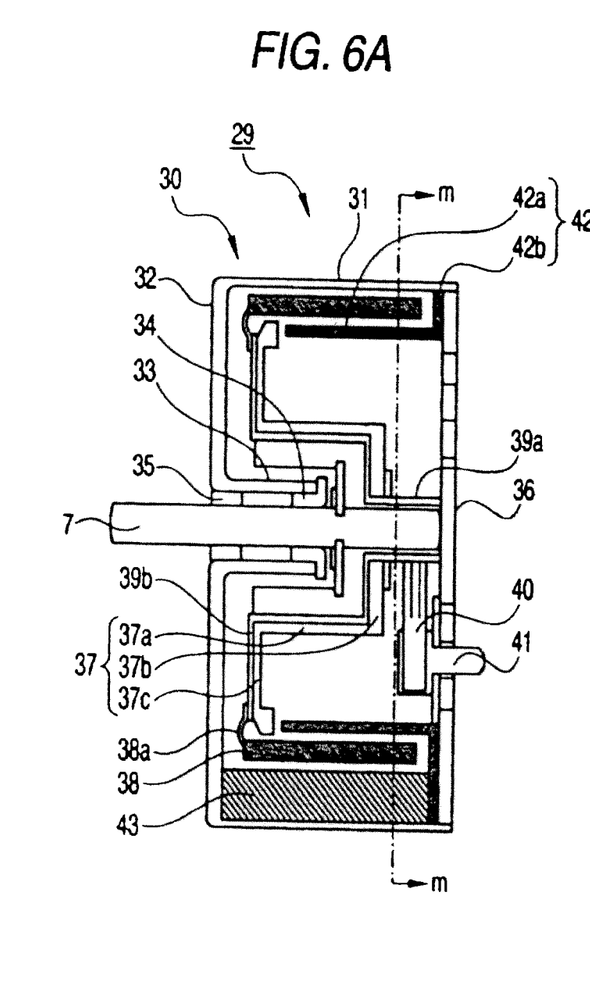
FIG. 6A is a longitudinal sectional view and FIG. 6B is a transverse sectional view, which illustrate a coreless motor to which the magnet configuration of the invention is applied.
Figure 6B:
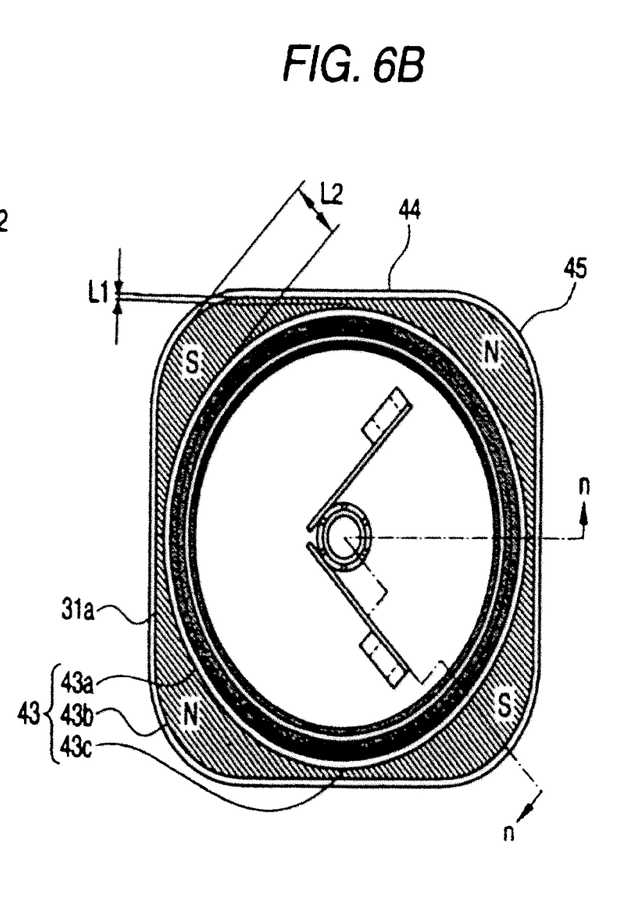

FIGS. 6A and 6B illustrate sectional views of a coreless motor to which the magnet configuration of the invention is applied.

FIG. 6A is a sectional view taken along a line n-n in FIG. 6B, and FIG. 6B is a transverse sectional view taken along a line m-m in FIG. 6A. A coreless motor 29 of the invention is contained in the small DC motor of the invention.

The coreless motor 29 includes an armature assembly rotatably disposed within a motor frame 30, the motor frame 30 including a commutator mold 37, an armature windings-molded element 38 and a shaft 7.

A motor frame 30 of the coreless motor 29 includes a cylindrical portion 31, an end plate portion 32 which is provided continuously to the cylindrical portion 31, and a bearing support portion 33 which is provided continuously to the end plate portion 32. In an interior of the bearing support portion 33, a shaft 7 is rotatably supported by two bearings 34, 35 which are separated from one another so as to be provided at upper and lower ends of the bearing support portion 33, respectively. One end of the shaft 7 is brought into abutment with a bottom plate 36. A commutator mold 37 is provided on the shaft 7.

The commutator mold 37 includes a cylindrical portion 37a which is made of resin and is provided in such a manner as to surround the circumference of the bearing support portion 33 of the motor frame 30, an inner annular plate portion 37b which is provided continuously to an end of the cylindrical portion 37a and is fixed to the shaft 7, and an outer annular plate portion 37c which is provided on the other end of the cylindrical portion 37a in such a manner as to protrude radially outwardly therefrom, and a commutator piece 39a and a riser 39b which continues to the commutator piece 39a to constitute a feeding path to an armature windings-molded element 38 are partially molded in the commutator mold 37 in such a manner as to be embedded integrally therewith. A radial outside of the riser 39b electrically connects to and supports with a required strength the armature windings-molded element 38 via a tap 38*a* made of a metallic elongated piece. A pair of brushes 40, which have contact with the commutator piece 39*a*, are mounted on a terminal 41 fixed to the bottom plate 36.

The armature windings-molded element 38 takes a configuration in which a coil into which an armature winding is wound has a thin cylindrical shape and is then fixed by a resin, taking in the tap 38*a* on its way to the top so as to connect to the riser 39*b* via the tap 38*a*. An inner yoke 42 and field magnets 43 are disposed on a stationary side in such a manner as to hold the armature winding molded element 38 on a rotating side therebetween. The inner yoke 42 includes a cylindrical portion 42*a* which faces the armature windings-molded element 38 and a bent portion 42*b* which is disposed on the bottom plate 36. The field magnets 43 are disposed in such a manner that their magnetic centers are disposed to match connecting portions 45 which connect together individual sides 44 of the motor frame 30.

The cylindrical portion 42*a* of the inner yoke 42 short-circuits magnetic flux generated in the field magnets 43 to thereby reduce leakage magnetic flux.

The motor frame 30 includes the cylindrical portion 31, the cylindrical portion 31 having a constant thickness and having a cross section in a shape that comprises the four sides 44 and the connecting portions 45, each of the connecting portions 45 connecting adjacent two of the four sides 44 and being located inward from a corresponding corner in a quadrangle comprising the four sides 44, the end plate portion 32 which is provided continuously to the cylindrical portion 31, and the bearing support portion 33 which is provided continuously to the end plate portion 32. In a cross section of the cylindrical portion 31, the sides 44 that are separated from one another are connected to each other by arcs at the corner portions 45. The bearing support portion 33 has a cylindrical shape.

The reduction in size of the motor can be enabled without reducing the thickness of central portions of magnetic poles of the field magnets 43 by forming the shape of the cylindrical portion 31 of the motor frame 30 basically into a quadrangular shape which has the same number of corner portions as the number of magnetized magnetic poles of the field magnets 43.

The outside diameter of the armature windings-molded element 38 is set relative to the inside diameter of the cylindrical portion 31 of the motor frame 30 such that only a necessary minimum air gap G and a width L1 at both ends of the field magnets 43 in the rotating direction are provided therebetween at a position where the outside diameter of the armature windings-molded element 38 comes nearest to the inside diameter of the cylindrical portion 31, that is, at a position of a central position of each side 44 in the event of this embodiment. In the example shown in FIG. 6, this setting is carried out at the central portion of each side 44.

The air gap G is determined mainly by accuracies of two constituent components, that is, the accuracy of the inside diameter of the motor frame 30 and the accuracy of the outside diameter of the armature windings-molded element 38. Due to this, the air gap G takes a value of the order of 0.1 mm to 0.5 mm as an actual dimension.

The radius of the arc on an inside of the corner portion 45 of the motor frame 30 is set to any value in the range of 5% to 85% of a length from the center of the shaft 7 to an arc-shaped surface of an inside portion 43*a* of the field magnet 43 which lies on a shaft 7 side thereof, whereby the armature windings-molded element 38 can be disposed as being enlarged in diameter without being restricted by the field magnets 43 with respect to a location where it is disposed, and consequently, the winding number of an armature winding can be increased so as to increase torque to be generated. Preferably, the radius of the arc-shape at the connecting portion 45 of the motor frame 30 is set to an arbitrary value in the rang of 65% to 85% of the length from the center of the shaft 7 to the arc-shaped surface of the inside portion 43*a* of the field magnet 43 which lies on the shaft 7 side thereof.

The field magnets 43 are made of, for example, neodymium magnets (Nd—Fe—B) or the like, are magnetized in a radial direction or rotating direction, and are disposed, respectively, at the connecting portions 45 of the cylindrical portion 31 having the quadrangular cross section in such a manner as to be spaced apart from one another.

The cross section of the field magnet 43 has a shape in which the inside portion 43*a* (a side which lies conformable to the armature windings-molded element 38) exhibits an arc-shape having a radius from the center of the shaft 7, while an outside portion 43*b* is made to firmly secure to an inside surface 31*a* of the cylindrical portion 31 of the motor frame 30. A connecting portion 43*c* between the inside portion 43*a* and the outside portion 43*b* has an angle at which it intersects the inside surface 31*a* of the cylindrical portion 31 of the motor frame 30 at right angles, but the connecting portion 43*c* can also be has an arbitrary angle.

In particular, in the small DC motor 1, in order to optimize a relationship between the (BH) max (a maximum energy product) of the field magnet 43 which largely affects the motor properties and the outside diameter dimension of the armature windings-molded element 38 which makes up a magnetic constituent portion of the rotating element, one or both of the following two conditions are set:

(1) A condition that the ratio of the width L2 to the width L1 of the magnet is set in the range of $2.0 \leq L2/L1 \leq 3.0$; and (2) A condition that the ratio of corner R to the inside radius of the magnet is set in the range of 65% to 85%.

The field magnets 43 may be such as to have portions which are magnetized alternately to different magnetic poles in one direction along the circumferential surface, or the magnetized portions of the field magnets 43 may be separated from one another, or each of the portions of the field magnets 43 which are magnetized to different magnetic poles may have portions which have conformable contact with the connecting portions 45 of the magnet frame 30.

By adopting this configuration, the effective magnetic flux of the armature windings-molded element 38 can be increased, and furthermore, a winding region of the armature windings-molded element 38 can be increased, and the quantity of the field magnets 43 to be used, which are expensive as a motor component, can be suppressed, whereby torque to be generated is increased while reducing in size of the motor, so that the cost and volume of the motor is reduced.

The configuration of the motor frame 30 and the field magnets 43 can be altered variously as has been described above.

In the coreless motor of Embodiment 3, since the outside diameter of the armature windings-molded element 38 is set relative to the inside diameter of the cylindrical portion 31 of the motor frame 30 such that the necessary minimum air gap G and the necessary minimum width L1 for the field magnets 43 are provided therebetween at the position where the outside diameter of the armature windings-molded element 38 comes nearest to the inside diameter of the cylindrical portion 31, that is, at the position of the central position of each side 44 in the event of this embodiment, the radial length of the armature windings-molded element 38 can be increased, and due to this, the winding space can be increased, so that the diameter of the armature windings-molded element 38 can be maximized to increase the starting torque, while minimizing the quantity of the expensive field magnets 43 to be used, whereby the size of the motor can be reduced.

In addition, since the shape of the cylindrical portion 31 of the motor frame 30 is formed into the quadrangular shape which has the same number of connecting portions 45 as the number of magnetized magnetic poles of the field magnets 43, the size of the motor can be reduced without reducing the thickness of the central portions of the poles of the field magnets 43 which accomplishes the sinusoidal magnetization properties.

Additionally, since the shape of the commutator mold 37 includes the cylindrical portion 37a which is provided in such a manner as to surround the bearing support portion 33 of the motor frame 30, the inner annular plate portion 37b which is provided continuously to the end of the cylindrical portion 37a and is fixed to the shaft 7, and the outer annular plate portion 37c which is provided on the other end of the cylindrical portion 37a in such a manner as to protrude radially outwardly therefrom, the two bearings 34, 35 can be provided in such a manner as to be spaced apart from one another for stable support while securing a contact space between the commutator piece 39a and the brushes 40, so as to allow the cylindrical portion 42a of the inner yoke 42 to be formed long in the axial direction.

A resin reinforcement film can be provided on outside surfaces of the outer annular plate portion 37c and the armature windings-molded element 38 so as to make up an vibration-proof construction. The tap 38a and the riser 39b are connected together by welding. The tap 38a has a strip-shape and a curved portion is provided on part thereof in order to impart elasticity.

Since the field magnets 43 and the inner yoke 42 are provided to face one another while holding the armature windings-molded element 38 therebetween, a magnetic path (the inner yoke 42 or the like) of a magnetic material can be provided long, and the magnetic resistance of the magnetic path can be suppressed to a lower level, thereby making it possible to suppress the reduction in magnetic flux density. In addition, needless to say, cogging torque can also be suppressed.

Embodiment 4

Figure 7A:
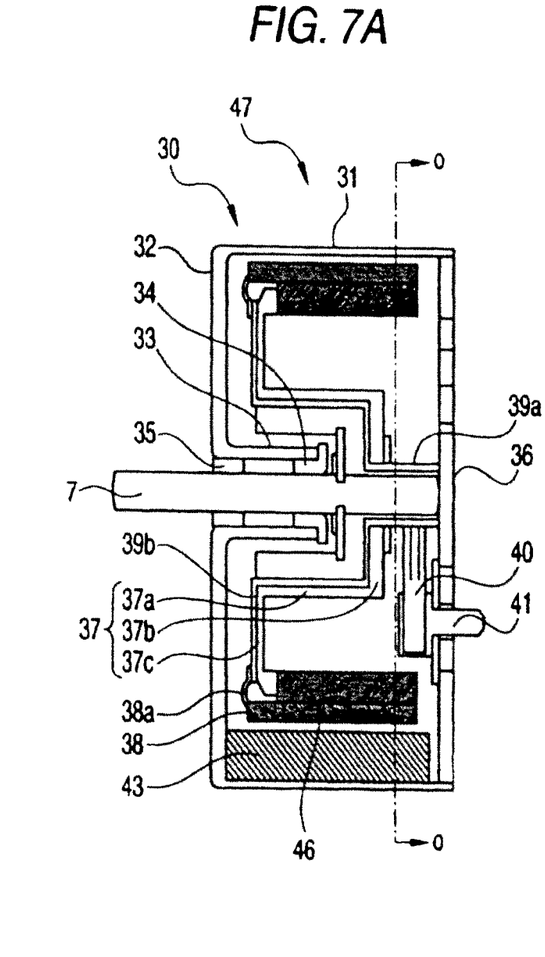
FIG. 7A is a longitudinal sectional view and FIG. 7B is a transverse sectional view, which illustrate a slotless cored motor to which the magnet configuration of the invention is applied.
Figure 7B:
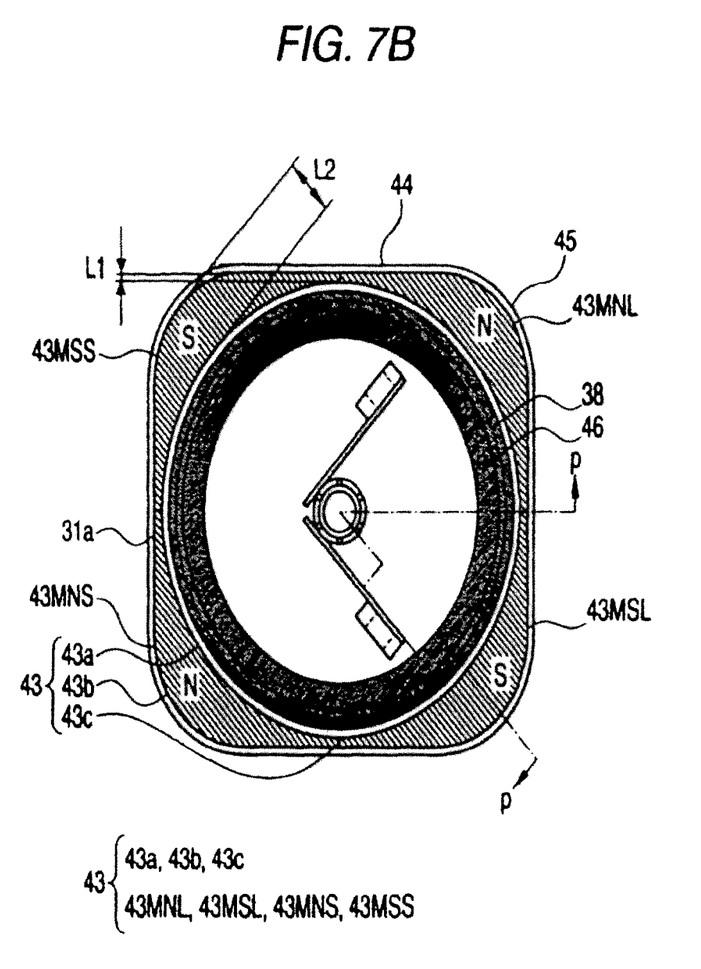

FIGS. 7A and 7B illustrate sectional views of a slotless cored motor to which the magnet arranging configuration of the invention is applied.

FIG. 7A is a sectional view taken along a line p-p in FIG. 7B, and FIG. 7B is a transverse sectional view taken along a line o-o in FIG. 7A. The slotless cored motor of this embodiment is also included in the small DC motor of the invention.

A slotless cored motor 47 of the invention is configured such that, in place of the inner yoke 42 of the coreless motor described in Embodiment 3, a movable back yoke 46 is provided in such a manner as to be in contact with an inner side of an armature windings-molded element 38 and the movable back yoke 46 is supported by a commutator mold 37. The movable back yoke 46 is made of resin into which a magnetic material is mixed, or a magnetic material, has no slots and a cylindrical shape like the armature windings-molded element 38.

Field magnets 43 are configured with four magnetic poles as in Embodiment 3 and comprises a pair of N pole magnet 43MNL and S pole magnet 43MSL, and a pair of N pole magnet 43MNS and S pole magnet 43MSS. This embodiment is characterized by utilization of one pair of N pole magnet and S pole magnet which have the same magnetic flux density as a unit. Magnets having different magnetic flux densities can be combined. The magnets are arranged so as to be disposed relative to the center of a shaft (rotating shaft) 7 at an even divergent angle.

To indicate a magnetic flux permeation path, for example, a magnetic flux generated from the field magnet 43MNL having the N pole permeates by way of the path via the armature windings-molded element 38, the movable back yoke 46, the armature windings-molded element 38, the field magnet 43MSL having the S pole and a motor frame 30 in this order. Since a location where the magnetic resistance becomes high is situated only at gaps among the magnet NML and the magnet MSL and the armature windings-molded element 38 along this path, a motor can be configured which has large magnetic flux density and large torque compared to the coreless motor in Embodiment 3.

In addition, since the movable back yoke 46 is provided inside the armature windings-molded element 38, compared to the coreless motor in Embodiment 3, inertial force becomes large and smooth rotation is provided.

While the embodiments have been described as being applied to the inner rotor motors, the invention can also be configured as an outer rotor motor in the event that a shaft is provided on a motor frame in which field magnets are provided, windings are fixed thereto and driving current is made to flow through the windings. In addition, the invention can also be configured as a generator in the event that an external power is imparted to the shaft for rotation.

The configurations that have been described heretofore can be combined differently in an appropriate fashion without altering the functions.

The armature assembly is allowed to rotate both inside and outside the magnets which are arranged at a predetermined diverging angle.

In addition to the embodiments that have been described heretofore, the individual configurations can be combined to configure small DC motors having arbitrary properties.

The present application claims foreign priority based on Japanese Patent Application (JP 2005-156248) filed May 27, 2005 and Japanese Patent Application (JP 2005-348016) filed Dec. 1, 2005, and the contents of which is hereby incorporated herein by reference.

What is claimed is:

1. A motor comprising:
   a motor frame being a magnetic material and being a magnetic constituent portion of the motor, wherein the motor frame has a shape consisting of four straight portions and four connecting portions, each of the connecting portions is between adjacent two of the four straight portions;
   a magnet disposed on an inner surface of the motor frame, wherein the magnet includes four magnetic poles and has an inner surface forming a circular opening;
   a rotor having a shaft and rotatably disposed in the circular opening of the magnet; and
   an air gap provided between the inner surface of the magnet and the rotor, the inner surface of the magnet facing the rotor,
   wherein each magnetic pole center of the magnet is corresponded to the connecting portions of the motor frame, and wherein each of the connecting portions of the motor frame defines a concentric arc shape, wherein each connecting portion comprises opposite ends, wherein the magnet directly abuts an entire surface of the concentric arc shape for each of the four connecting portions, wherein each of said opposite ends defines a point of intersection with an adjacent straight portion.

2. A motor according to claim 1, wherein the each of the connecting portions of the motor frame is a segment of a circle concentric with a center of the shaft.

3. A motor according to claim 1, wherein the magnet has a maximum thickness at portions corresponding to the connecting portions of the motor frame and wherein the thickness of the magnet gradually decreases from the maximum thickness to a minimum thickness at portions corresponding to the straight portions of the motor frame.

4. A motor according to claim 3, wherein a ratio of the width of the maximum thickness portion to the width of the minimum thickness portion in the radial direction of the magnet is 2.0 or more.

5. A motor according to claim 4, wherein the ratio of the width of the maximum thickness portion to the width of the minimum thickness portion in the radial direction of the magnet is between 2.0 to 4.0.

6. A motor comprising:
a motor frame being a magnetic material,
wherein the motor frame has a shape consisting of four straight portions and four connecting portions, each of the connecting portions is between adjacent two of the four straight portions;
a magnet disposed at an inner surface of the motor frame, the magnet including four magnetic poles and an inner surface forming a circular opening;
a rotor having a shaft and rotatably disposed in the circular opening of the magnet; and
an air gap provided between the inner surface of the magnet and the rotor, the inner surface of the magnet facing the rotor,
wherein each magnetic pole center of the magnet is corresponded to the connecting portions of the motor frame, and
wherein each of the connecting portions of the motor frame defines a concentric arc shape, wherein an entire outer circumferential surface of the magnet extending in a longitudinal direction of the shaft opposes and is secured to the inner surface of the motor frame extending in the longitudinal direction of the shaft,
the magnet and the motor frame are magnetic constituent portions of the motor,
wherein each connecting portion comprises opposite ends, wherein each of said opposite ends defines a point of intersection with an adjacent straight portion.

7. A motor according to claim 6, wherein the each of the connecting portions of the motor frame is a segment of a circle concentric with a center of the shaft.

8. A motor according to claim 6, wherein the magnet has a maximum thickness at portions corresponding to the connecting portions of the motor frame and
wherein the thickness of the magnet gradually decreases from the maximum thickness to a minimum thickness at portions corresponding to the straight portions of the motor frame.

9. A motor according to claim 8, wherein a ratio of the width of the maximum thickness portion to the width of the minimum thickness portion in the radial direction of the magnet is 2.0 or more.

10. A motor according to claim 9, wherein the ratio of the width of the maximum thickness portion to the width of the minimum thickness portion in the radial direction of the magnet is between 2.0 to 4.0.

* * * * *